US009166858B2

(12) United States Patent
Dandach et al.

(10) Patent No.: US 9,166,858 B2
(45) Date of Patent: Oct. 20, 2015

(54) METHOD FOR MODULATING AN OQAM TYPE MULTI-CARRIER SIGNAL, AND CORRESPONDING COMPUTER PROGRAM AND MODULATOR

(75) Inventors: Youssef Dandach, Rennes (FR); Pierre Siohan, Rennes (FR)

(73) Assignee: Orange, Paris (FR)

( * ) Notice: Subject to any disclaimer, the term of this patent is extended or adjusted under 35 U.S.C. 154(b) by 0 days.

(21) Appl. No.: 14/002,001

(22) PCT Filed: Feb. 27, 2012

(86) PCT No.: PCT/FR2012/050401
§ 371 (c)(1),
(2), (4) Date: Nov. 6, 2013

(87) PCT Pub. No.: WO2012/117191
PCT Pub. Date: Sep. 7, 2012

(65) Prior Publication Data
US 2014/0064407 A1    Mar. 6, 2014

(30) Foreign Application Priority Data

Feb. 28, 2011 (FR) .................................... 11 51590

(51) Int. Cl.
*H04L 27/36* (2006.01)
*H04L 27/26* (2006.01)

(52) U.S. Cl.
CPC ............ *H04L 27/362* (2013.01); *H04L 27/264* (2013.01); *H04L 27/2631* (2013.01); *H04L 27/2633* (2013.01); *H04L 27/2698* (2013.01)

(58) Field of Classification Search
CPC .............. H04L 27/264; H04L 27/2698; H04L 27/2633; H04L 27/2631
See application file for complete search history.

(56) References Cited

U.S. PATENT DOCUMENTS

| 7,099,396 | B1 | 8/2006 | Combelles et al. | |
|---|---|---|---|---|
| 2003/0225806 | A1* | 12/2003 | Hu et al. | 708/404 |
| 2005/0128993 | A1* | 6/2005 | Yu et al. | 370/342 |
| 2006/0215777 | A1* | 9/2006 | Krishnamoorthi | 375/260 |
| 2011/0142152 | A1* | 6/2011 | Bellanger | 375/261 |
| 2011/0216644 | A1* | 9/2011 | Hasegawa | 370/210 |

(Continued)

FOREIGN PATENT DOCUMENTS

FR    2765757 A1    1/1999

OTHER PUBLICATIONS

International Preliminary Report on Patentability and Written Opinion dated Sep. 3, 2013 for corresponding International Application No. PCT/FR2012/050401, filed Feb. 27, 2012.

(Continued)

*Primary Examiner* — Aristocratis Fotakis
(74) *Attorney, Agent, or Firm* — David D. Brush; Westman, Champlin & Koehler, P.A.

(57) ABSTRACT

A modulator and modulation method are provided, which output an OQAM multi-carrier signal. The method implements a step of transforming, from the frequency domain to the time domain, a set of M symbols of real data so as to output M transformed symbols. The complete transformation includes the following sub-steps: applying a partial Fourier transform to the set of M symbols of real data, outputting a first subset of C transformed symbols, where C is strictly less than M; and obtaining, from the first subset, a second subset of (M-C) transformed symbols that is complementary to the first subset.

18 Claims, 3 Drawing Sheets

(56) References Cited

U.S. PATENT DOCUMENTS

Figure 1:
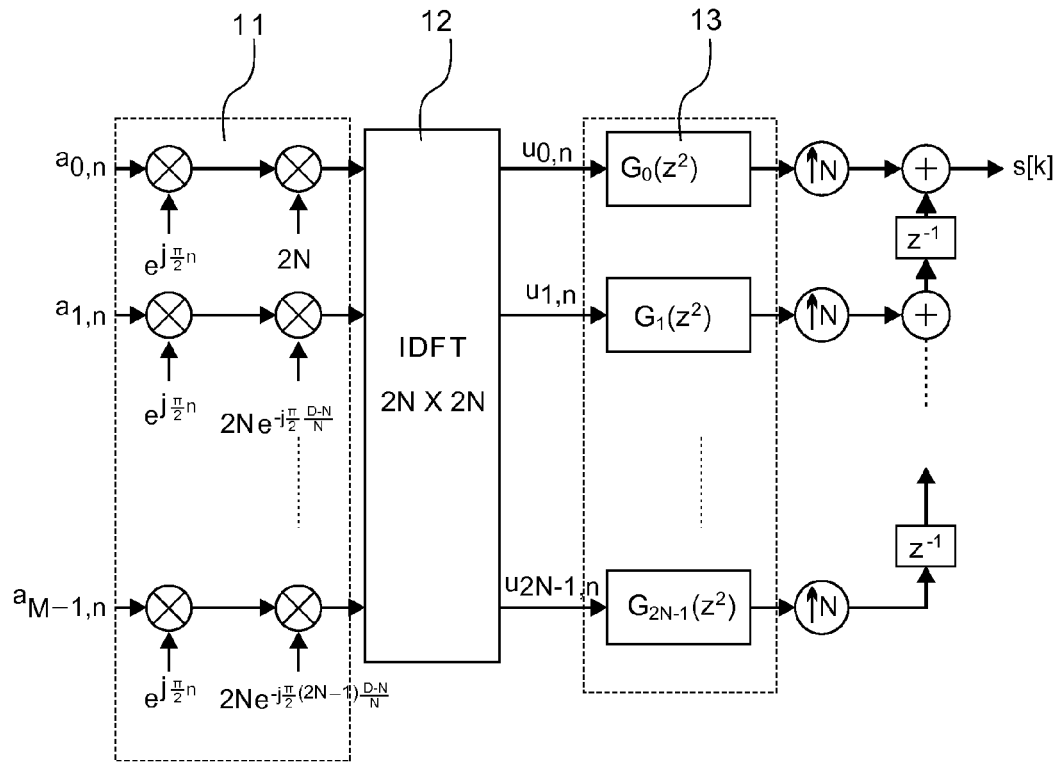

2012/0243625 A1* 9/2012 Berg .................... 375/260
2014/0348252 A1* 11/2014 Siohan et al. ............ 375/261

OTHER PUBLICATIONS

French Search Report and Written Opinion dated Oct. 20, 2011 for corresponding French Patent application No. 11 51590 filed on Feb. 28, 2011.
Sahnine et al.: "Efficient design approach and advanced architectures for universal OFDM systems", Microelectronics and Electronics Conference, 2007. RME. Ph. D. Research in, IEEE, PI, Jul. 1, 2007, pp. 33-36, XP031189856.
Jones D. L.: "Decimation-in-Time (DIT) Radix-2 FFT", Sep. 15, 2006, XP002661750.
Hao Lin et al.: "OFDM/OQAM with Hermitian Symmetry: Design and Performance for Baseband Communication", IEEE International Conference on Communications, 2008: ICC '08; May 19-23, 2008, Beijing, China, IEEE Piscataway, NJ, USA, May 19, 2008, pp. 652-656, XP031265449.
Dandach et al.: "FBMC/OQAM Modulators with Half Complexity", Global Telecommunications Conference (GLOBECOM 2011), 2011, IEEE, IEEE, Dec. 5, 2011, pp. 1-5, XP032097625.
P. Siohan et al.: "Analysis of OFDM/OQAM systems based on the filterbank theory", Proc. GLOBECOM'99, Rio de Janeiro, Brazil, Dec. 1999, pp. 2279-2284.
C. Siclet et al.: "Design of BFDM/OQAM systems based biorthogonal modulated filter banks", Proc GLOBECOM'00, San Francisco, USA, Nov. 2000, pp. 701-705.
P. Duhamel et al.: "Implementation of "Split-radix" FFT algorithms for complex, real, and real symmetric data", "Acoustics, Speech, and Signal Processing", IEEE International Conference ICASSP '85., vol. 10, Apr. 1985, pp. 784-787.
J. Cooley et al.: "An Algorithm for the Machine Calculation of Complex Fourier Series", Mathematics of Computation, vol. 19, No. 90 (Apr. 1965), pp. 297-301.
International Search Report dated Jun. 21, 2012 for corresponding International Patent Application No. PCT/FR2012/050401, filed Feb. 27, 2012.

* cited by examiner

METHOD FOR MODULATING AN OQAM TYPE MULTI-CARRIER SIGNAL, AND CORRESPONDING COMPUTER PROGRAM AND MODULATOR

CROSS-REFERENCE TO RELATED APPLICATION

This Application is a Section 371 National Stage Application of International Application No. PCT/FR2012/050401, filed Feb. 27, 2012, and published as WO 2012/117191 A1 on Sep. 7, 2012, in French, the contents of which are hereby incorporated by reference in their entireties.

1. FIELD OF THE INVENTION

The field of the invention is that of digital communications.

More specifically, the invention pertains to the phase for modulating OFDM/OQAM (Orthogonal Frequency Division Multiplexing/Offset Quadrature Amplitude Modulation) or BFDM/OQAM (Biorthogonal Frequency Division Multiplexing/OQAM) type multicarrier signals for which the carriers are shaped by a prototype filter.

The invention can be applied especially in the field of wireless communications (DAB, DVB-T, WLAN, non-guided optics, etc.), or wire-based communications (xDSL, PLC, optical communications, etc.).

2. PRIOR ART

The techniques of multicarrier transmission have numerous advantages, especially in the context of multipath channels. Thus, OFDM-type modulations are particularly well-suited to countering the effects of fading in frequency-selective channels.

However, these OFDM modulations have the drawback of generating a multicarrier signal having poor frequency localization and therefore require the introduction of a guard interval into the time domain to limit interference. Now, the insertion of such a guard interval reduces the spectral efficiency of the multicarrier signal.

Alternative solutions have been proposed to limit interference while removing the need to insert a guard interval. These techniques rely on the shaping of the signal by filters (for a discretized signal) or by functions (for a continuous signal), called prototypes enabling better frequency localization through properties of orthogonality restricted to the field of the real values. These are for example OFDM/OQAM or BFDM/OQAM type modulations, conventionally used for radiofrequency communications as described especially in the documents "*Analysis of OFDM/OQAM systems based on the filterbank theory*", P. Siohan and N. Lacaille, Proc. GLOBECOM'99, Rio de Janeiro, Brazil, December 1999, pp. 2279-2284, and "*Design of BFDM/OQAM systems based on biorthogonal modulated filter banks*", C. Siclet and P. Siohan, Proc. GLOBECOM'00, San Francisco, USA, November 2000, pp. 701-705.

FIG. 1 provides a more precise illustration of the scheme of an OFDM/OQAM classic modulator delivering an OFDM/OQAM multicarrier signal. Such a signal can be represented, in baseband and in discrete time, in the following form:

$$s[k] = \sum_{m=0}^{M-1} \sum_{n=-\infty}^{n=+\infty} a_{m,n} h[k-nN] e^{j\frac{2\pi}{M}m(k-D/2)} e^{j\phi_{m,n}}$$

with:
- $a_{m,n}$ as a data symbol with a real value to be transmitted on a carrier m at the instant n;
- M is the number of carrier frequencies;
- N=M/2 is a discrete time shift;
- h[n] is the prototype filter used by the modulator, with a length L;
- D is the delay introduced by the prototype filter such that D=L−1;
- $\phi_{m,n}$ is a phase term chosen so as to achieve an alternation between real part and imaginary part enabling orthogonality, for example equal to $$\frac{\pi}{2}(n+m).$$

As illustrated in FIG. 1, the data symbols $a_{m,n}$ which carry a real value undergo pre-processing or pre-modulation 11, making it possible especially to ensure a quadrature operation, in time and in frequency, of the carriers of the multicarrier signal.

More specifically, during this pre-processing operation, the real data symbols $a_{m,n}$ are multiplied by a first phase term using π/2, providing for a time and frequency phase shift of the carriers of the multicarrier signal and by a second term making it possible to take account of the length of the prototype filter. The data symbols obtained at output of this pre-processing module, which are denoted as $a_{m,n}^P$, can be expressed in the following form:

$$a_{m,n}^P = a_{m,n} e^{j\frac{\pi}{2}n} 2N e^{-j\frac{\pi}{2}m\frac{D-N}{N}}.$$

These data symbols are then converted from the frequency domain into the time domain, in classically using an inverse discrete Fourier transform (IDFT) sized M in an IDFT module 12. The transformed signals obtained at output of the IDFT module 12, denoted as $u_{0,n}$ to $u_{2N-1,n}$ are then filtered by the prototype filter h[n] 13, then sub-sampled and offset to obtain the OFDM/OQAM multicarrier signal s[k]. More specifically, the prototype filter h[n] can be expressed in its polyphase form comprising M polyphase components $G_l(z)$, defined by:

$$G_l(z) = \sum_n h[l+nM] z^{-n}.$$

Furthermore, for an OFDM/OQAM type modulation, the data symbols $a_{m,n}$, at the symbol instant n and for the carrier m, come from usual preliminary operations (not shown), comprising the transformation of initial data in the form of a binary string into Q-ary symbols. In the case of a quadrature amplitude modulation QAM with a square constellation having $2^{2K}$ states, where each state corresponds to a complex value, this transformation is of a binary-to-2Kary type. For example, for a 4-QAM operation, the four states are (1+i), (1−i), (−1+i), (−1−i). Then, as in the context of an OFDM/

OQAM transmission, the real and imaginary parts are processed separately. This amounts to having a one-dimensional constellation with K states, where each possible state corresponds to a real value (1 or −1 for a 4-QAM for example). In other words, the data symbols $a_{m,n}$ are the result of a PAM (Pulse Amplitude Modulation) type of binary-to-Kary transformation.

However, despite the gain offered by OFDM/OQAM type modulations as compared with OFDM modulations at the spectral efficiency level, because they make it possible to remove the need for inserting the guard interval, OFDM modulations are often preferred because they are simple to implement.

In particular, the OFDM/OQAM modulation is more complex than the OFDM modulation in terms of operational complexity (i.e. in number of multiplications and additions).

Indeed, for a given number of sub-carriers and a fixed bit rate that is identical for the data symbols of the two modulation systems, the OFDM/OQAM modulation necessitates an inverse discrete Fourier transform (IDFT) at the rate of the real data symbols, i.e. at a rate that is twice that of the OFDM modulation. The number of operations during IDFT performed by the OFDM/OQAM modulator is therefore twice that performed by the OFDM modulator to produce a same number of multicarrier symbols at output of the modulator.

Furthermore, the OFDM/OQAM modulation requires a shaping by a prototype filter, which gives rise to specific operations. The OFDM modulator for its part uses a rectangular filter which does not require any particular operations. However, it can be noted that this cost of complexity is relatively low for prototype filters of short length L (equal to several times the number of carriers M).

There is therefore a need for a novel technique of modulation to generate an OFDM/OQAM or BFDM/OQAM type multicarrier signal having lower complexity than the techniques of the prior art.

3. SUMMARY OF THE INVENTION

The invention proposes a novel approach that does not have all these drawbacks of the prior art in the form of a method of modulation delivering an OQAM type multicarrier signal.

According to the invention, such a method implements a step for the transformation, from the frequency domain to the time domain, of a set of M real data symbols delivering M transformed symbols, called a complete transformation step, comprising the following sub-steps:
  applying a partial Fourier transform to the set of M real data symbols delivering a first subset of C transformed symbols with C being strictly smaller than M;
  obtaining, from the first subset, a second subset of (M−C) transformed symbols complementary to said first subset.

The invention thus proposes a novel technique of OFDM/OQAM modulation or BFDM/OQAM type modulation, more generally called OQAM, having lower complexity than the prior art techniques.

More specifically, the invention proposes the computation solely of a part of the outputs of a frequency/time transformation module in using a partial Fourier transform type algorithm and the deducing of the remainder of the outputs of the frequency/time transformation module from the first outputs computed.

In this way, the number of classically performed operations (multiplications, additions) is considerably reduced.

According to one particular characteristic of the invention, the first and second subsets have an identical size. In other words, C=M/2.

Thus, during the first sub-step, half of the outputs of the frequency/time transformation module, corresponding for example to the upper half of the outputs of this module, are computed and, during the second sub-step, the other half of the outputs of the frequency/time transformation module, corresponding in this example to the lower half of the outputs of this module, are obtained.

For example, the first subset comprises the transformed symbols associated with the outputs of said complete transformation step having a same-parity index.

In particular, if we consider a classic inverse fast Fourier transform of the split radix type implementing a decimation in frequency as described especially by P. Duhamel and H. Hollmann in *"Implementation of "split-radix" FFT algorithms for complex, real, and real symmetric data"*, "Acoustics, Speech, and Signal Processing", IEEE International Conference ICASSP '85., vol. 10, April 1985, pp. 784-787, the input indices of the transform are in the natural order and the output indices are in a different order known as a "bit reversal" order. In this case, for an even-parity M-sized transform, the M/2 first outputs have even-parity indices. It is therefore possible to implement a partial Fourier transform enabling the computation of only outputs with even-parity indices.

Thus, the first sub-step according to the invention implements for example a split-radix type partial IFFT implementing a decimation in frequency enabling the computation of only the first half of the outputs of the frequency/time transformation module delivering a first subset comprising only the outputs with even-parity indices. The second sub-step then makes it possible to deduce the outputs with odd-parity index from the outputs with even-parity index. A "split radix" algorithm of this kind has the advantage of great speed.

Naturally, other frequency/time transformation algorithms can also be implemented, such as the one proposed by Cooley-Tukey in *"An Algorithm for the Machine Calculation of Complex Fourier Series"*, Math. Computat., 1965. Such algorithms can indeed be implanted more easily in electronic components than the "split radix" algorithm.

According to one particular characteristic, the method of modulation according to the invention comprises a step of pre-processing of the real data symbols implemented preliminarily to said complete transformation step.

A pre-processing step of this kind, also called a pre-modulation step, implements a multiplication of the real symbols by a phase term $$\left(e^{j\frac{\pi}{2}n}\right),$$

making it possible to ensure a π/2 phase shift in time of the OQAM multicarrier signal. It also carries out a multiplication by a term taking account of the length of the prototype filter $$\left(2Ne^{-j\frac{\pi}{2}m\frac{D-N}{N}}\right),$$

making it possible to account of the causality of the prototype filter as well as ensuring a π/2 phase shift in frequency of the carriers. A modulator implementing the method of modulation according to the invention is therefore physically achievable, since it is based on the use of a causal prototype filter.

In particular, the step for obtaining determines a first part of the second subset from a first part of the first subset, in using a first mathematical relationship, and determines a second part of the second subset from a first part of the first subset, in using a second mathematical relationship, the first and second parts of the first subset, and of the second subset respectively, being complementary.

For example, if we consider that the first subset comprises the outputs with even-parity index and the second subsets comprise the outputs with odd-parity index, the first half of the outputs with even-parity index are used to obtain the first half of the outputs with odd-parity index from a first mathematical relationship, and the second half of the outputs with even-parity index are used to obtain the second half of the outputs with odd-parity index from a second mathematical relationship.

According to a first aspect, with L as an even-parity value (D as an odd-parity value), we consider an ODFM/OQAM or BFDM/OQAM type modulator with a delay parameter D=L−1, and a prototype filter with a length L equal to qM+2p, with q and p being integers such that q≥0 and 0≤p≤M/2−1 and M is divisible by 4. Two cases are then to be considered. In the first case, it is assumed that 0≤p≤M/4−1 and the following relationships can then be used to deduce the second subset from the first subset:

first mathematical relationship: $u_{M/2+2p-k-1,n}=(-1)^n u^*_{k,n}$, for an integer k such that 0≤k≤M/4+p−1 and second mathematical relationship: $u_{3M/4+p-k-1,n}=(-1)^n u^*_{3M/4+p+k,n}$, for an integer k such that 0≤k≤M/4−p−1, with:

$u_{m,n}$ a transformed symbol associated with the output with index m of the complete transformation step at an instant n;

* the conjugate operator.

In the second case where L is an even-parity value, it is considered this time that M/4≤p≤M/2−1, and the following relationships can then be used to deduce the second subset from the first subset:

first mathematical relationship: $u_{2p-M/2-k-1,n}=(-1)^n u^*_{k,n}$, for an integer k such that 0≤k≤p−M/4−1 and second mathematical relationship: $u_{M-k-1,n}=(-1)^n u^*_{2p-M/2+k,n}$, for an integer k such that 0≤k≤3M/4−p−1, According to a second aspect, with D as an odd-parity value, if we consider a BFDM/OQAM type modulator with a delay parameter D<L−1, such that D=qM+2p−1, with L being the length of the prototype filter, q and p being integers such that q≥0 and 0≤p≤M/2−1, and M divisible by 4, two cases are then to be considered. In the first case, it is assumed that 0≤p≤M/4−1 and the following relationships can be used to deduce the second subset from the first subset:

first mathematical relationship: $u_{M/2+2p-k-1,n}=(-1)^n u^*_{k,n}$, for an integer k such that 0≤k≤M/4+p−1 and second mathematical relationship: $u_{3M/4+p-k-1,n}=(-1)^n u^*_{3M/4+p+k,n}$, for an integer k such that 0≤k≤M/4−p−1.

In the second case where L is an even-parity number, it is considered this time that M/4≤p≤M/2−1, and the following relationships can then be used to deduce the second subset from the first subset:

first mathematical relationship: $u_{2p-M/2-k-1,n}=(-1)^n u^*_{k,n}$, for an integer k such that 0≤k≤p−M/4−1 and second mathematical relationship: $u_{M-k-1,n}=(-1)^n u^*_{2p-M/2+k,n}$, for an integer k such that 0≤k≤3M/4−p−1, It is thus possible to use the invention in modulators having delays D strictly smaller than L−1.

According to a third aspect, we consider the particular case of a BFDM/OQAM type modulator with a delay parameter D<L−1, such that D=qN−1, with q=2q'+1, q' is an integer, M is divisible by 2, and of a linear phase prototype filter with a length L.

In this particular case, a single mathematical relationship can be used to deduce the second subset from the first subset: $u_{M-1-k,n}=(-1)^n u^*_{k,n}$, for an integer k such that 0≤k≤M/2−1.

Furthermore, in this particular case of a linear phase filter, the method of modulation according to the invention comprises a phase of polyphase filtering of M transformed symbols implementing polyphase components such that $G_k(z)=z^{-(q-1)}G_{M-1-k}(z^{-1})$ for 0≤k≤M/2−1.

In other words, the outputs of the frequency/time transformation module are conjugate in sets of two, and the polyphase components of the prototype filter are para-conjugate in sets of two.

It is therefore possible to use this symmetry to reutilize a part of the results of the multiplications arising at different instants of filtering, and thus reduce the complexity of the filtering.

The invention also pertains to a computer program comprising instructions to execute the steps of the method for modulating described here above when said program is executed by a computer.

Indeed, the method of the invention can be implemented in various ways, especially in wired form or in software form.

In another embodiment, the invention pertains to a modulator delivering an OQAM type multicarrier signal.

According to the invention, such a modulator comprises means of transformation, from the frequency domain into the time domain, of a set of M real data symbols into M transformed symbols, comprising:

means of partial transformation of the set of M real data symbols, implementing a partial Fourier transform and delivering a first subset of C transformed symbols with C strictly smaller than M;

means for obtaining, from the first subset, a second subset of (M−C) transformed symbols complementary to the first subset.

A modulator of this kind is especially adapted to implementing the method of modulation described here above. It is for example an OFDM/OQAM or BFDM/OQAM modulator present in a transmission sequence.

This modulator could of course comprise the different characteristics pertaining to the method of modulation according to the invention, which can be combined or taken in isolation. Thus, the characteristics and advantages of this device are the same as those of the method described here above. It shall therefore not be described in more ample detail.

4. LIST OF FIGURES

Figure 2:
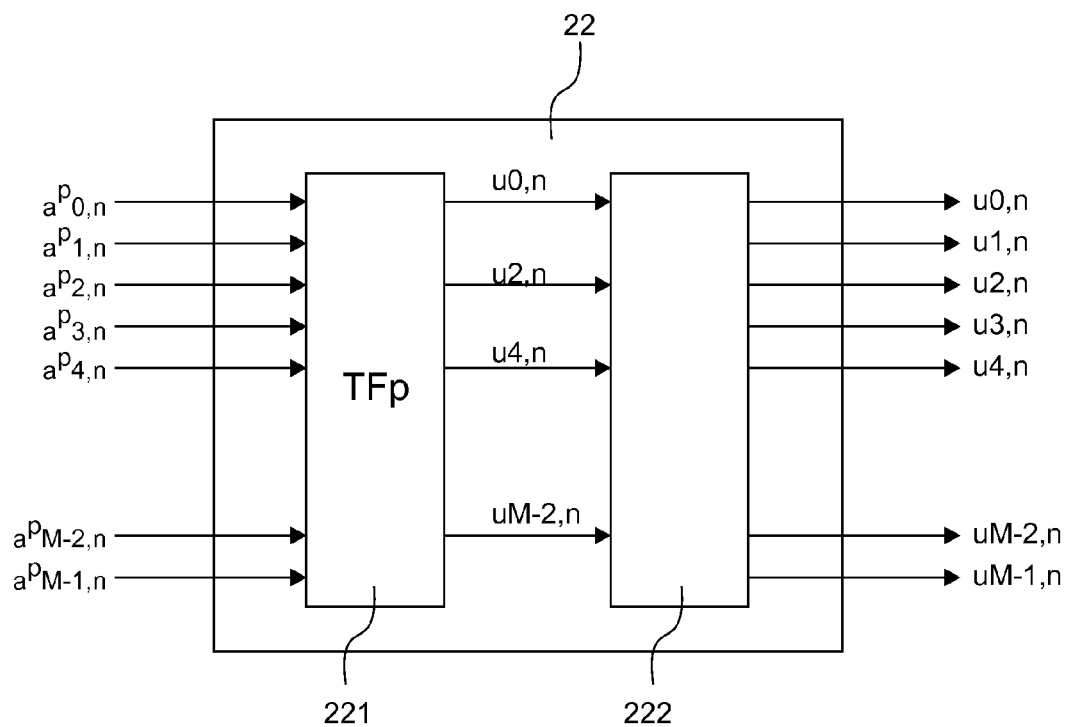
Figure 3:
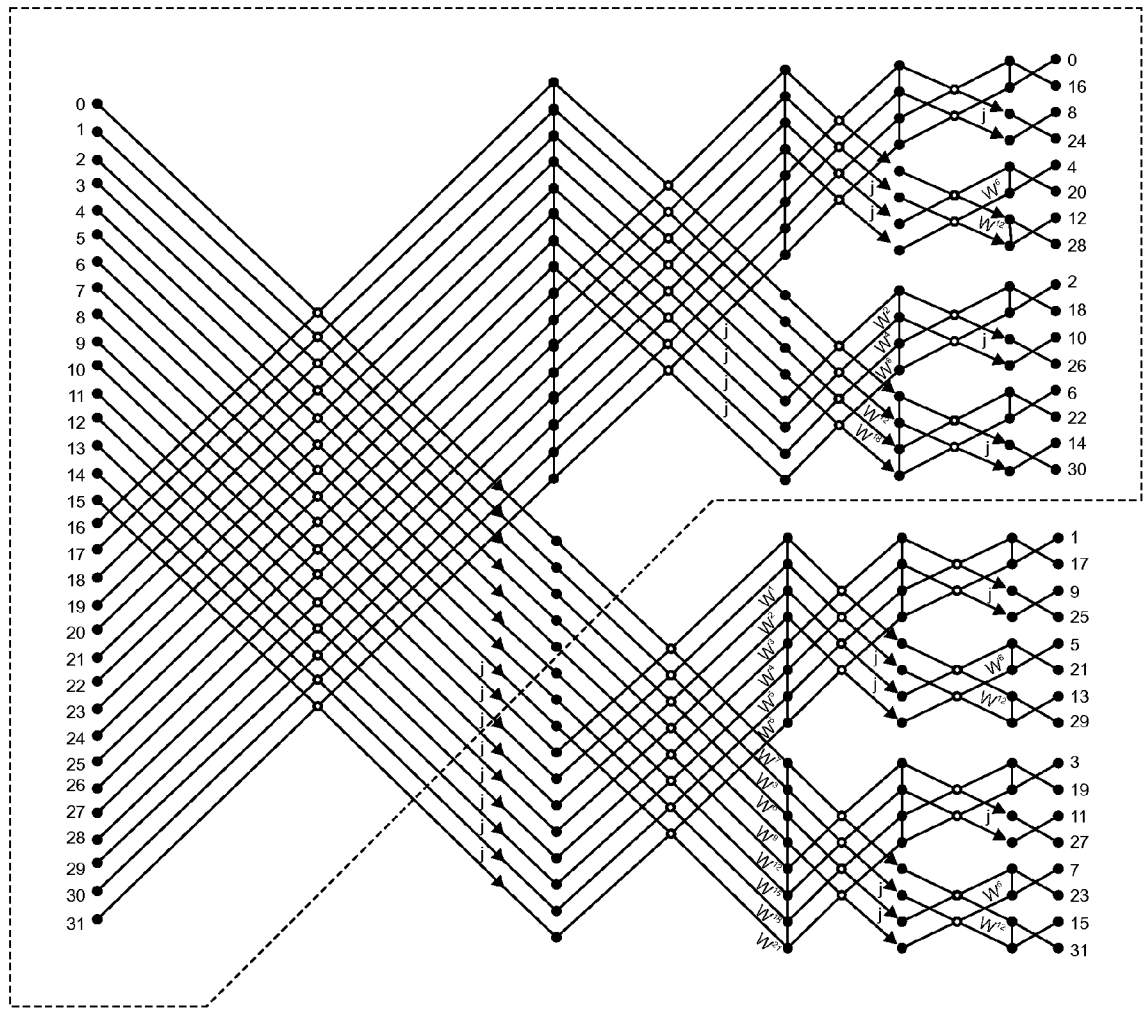
Figure 4:
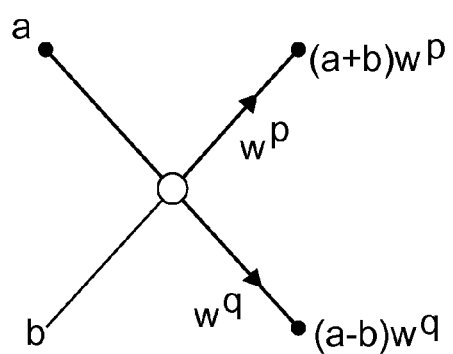
Figure 5:
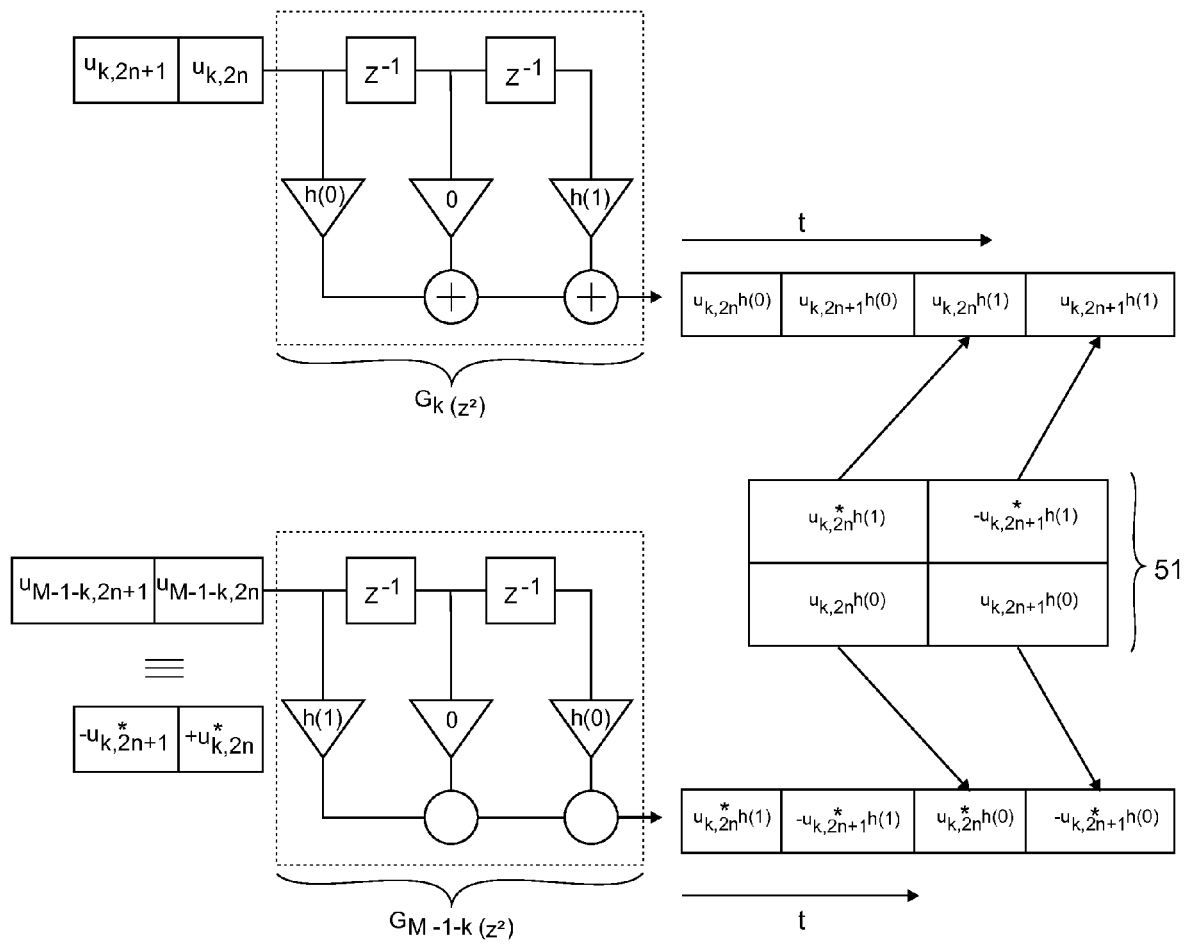
Figure 6:
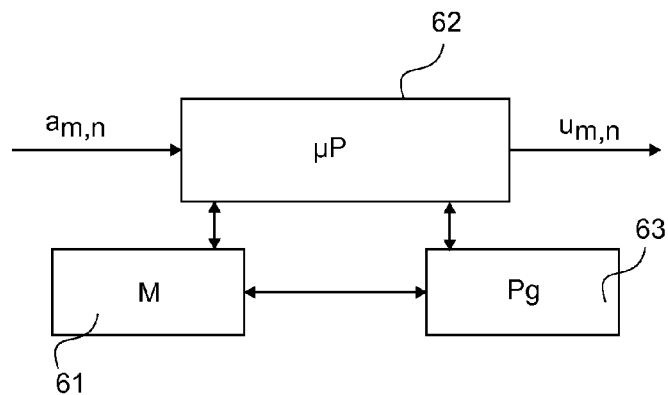

Other features and advantages of the invention shall appear more clearly from the following description of a particular embodiment given by way of a simple illustratory and non-exhaustive example and from the impended figures, of which:

FIG. 1 described with reference to the prior art presents a classic OFDM/OQAM modulation scheme;

FIG. 2 illustrates the main steps of the method of modulation according to the invention;

FIGS. 3 and 4 present an inverse fast Fourier transform algorithm of a "split-radix" type;

FIG. 5 illustrates the principle of reduction of complexity at the level of the polyphase filtering;

FIG. 6 presents the simplified structure of a modulator implementing a technique of modulation according to one particular embodiment of the invention.

5. DESCRIPTION OF ONE EMBODIMENT OF THE INVENTION

5.1 General Principle

The general principle of the invention relies on a particular implementation of the operation of transformation from the frequency domain to the time domain in an OFDM/OQAM or BFDM/OQAM modulator used to limit the complexity of this operation.

To this end, the invention proposes the computation, in a classic way, of only one part of the output coefficients output from this transformation operation, forming a first subset, and to deduce the other part of the output coefficients, forming a second subset, from this first subset.

FIG. 2 provides a more precise illustration of the main steps implemented by a method of modulation according to the invention, delivering an OFDM/OQAM or BFDM/OQAM type multicarrier signal. Said method can especially be implemented in an OFDM/OQAM modulator as described in the above-mentioned document: P. Siohan and N. Lacaille, "*Analysis of OFDM/OQAM systems based on the filterbank theory*", or in a BFDM/OQAM type modulator as described in the above-mentioned document: C. Siclet and P. Siohan, "*Design of BFDM/OQAM systems based on biorthogonal modulated filter banks*".

According to the invention such a method implements a step of transformation 22, from the frequency domain to the time domain, of a set of M real data symbols delivering M transformed symbols, called complete transformation symbols. It can be implemented in the modulator illustrated in FIG. 1, by implementing a complete transformation step 22 according to the invention in the IDFT module 12.

These M real data symbols, denoted as $a_{m,n}$, can undergo a pre-processing prior to the transformation operation 22 in a pre-processing module 11 as illustrated in FIG. 1, used especially to provide for a time and frequency quadrature of the carriers of the multicarrier signal obtained at output of the modulator and to take account of the length of the prototype filter. Using the same notations as those defined with reference to the prior art, the symbols obtained at output of this pre-processing module are denoted as $a_{m,n}^P$, where, $$a_{m,n}^P = a_{m,n} e^{j\frac{\pi}{2}n} 2N e^{-j\frac{\pi}{2}m\frac{D-N}{N}}$$

in particular, we have M=2N.

The complete transformation step 22 according to the invention implements two sub-steps:

- a first sub-step 221 implementing a partial Fourier transform on the set of M real data symbols, delivering a first subset of C transform symbols with C strictly smaller than M;
- a second sub-step 222 for obtaining, from the first subset, a second subset of (M-C) transformed symbols, complementary to the first subset.

It can be noted, as can be seen in FIG. 3, that the indices of the transformed symbols obtained at output of the complete transformation step 22 are not necessarily classified in the natural order but have undergone a bit reversal.

For example, the first subset comprises C=M/2 transformed symbols denoted as $u_{0,n}, u_{2,n}, u_{4,n}, \ldots, u_{M-2,n}$. The second subset, which is complementary to the first subset, then comprises M−C=M/2 transformed symbols, denoted as $u_{1,n}, u_{3,n}, \ldots, u_{M-1,n}$.

Indeed, the inventors have shown that there are mathematical relationships between the different outputs of the frequency/time transformation module of an OFDM/OQAM or BFDM/OQAM modulator. As a consequence, according to their research, it is no longer necessary to compute all the outputs of this module but possible to compute only a part thereof and to deduce the other part from these computations. Thus, the redundancy of the pieces of information output from a classic frequency/time transformation module is made use of so as not to compute all its outputs according to the invention.

These mathematical relationships between the different outputs of the transformation module are especially due to the fact that the data symbols $a_{m,n}$ are real and to the particular phase term $$e^{j\frac{\pi}{2}n} e^{-j\frac{\pi}{2}m\frac{D-N}{N}}$$

present at each instant n at the input m of the frequency/time transformation module.

The invention thus reduces the complexity of the operation of transformation from the frequency domain to the time domain, whether it is implemented by a "split radix" type algorithm or an equivalent algorithm such as the inverse fast Fourier transform algorithm proposed by Cooley-Tukey in the above-mentioned document.

5.2 Case of the OFDM/OQAM Modulator

A) First Example of an Application: L=qM

Here below, we describe a first example of an application of the invention, considering an OFDM/OQAM type modulator having a prototype filter, the length L of which is a multiple of the size of the frequency/time transformation M, i.e. L=qM, with q as an integer, and M divisible by 4.

In this case, if we consider a classic IFFT type frequency/time transformation for example, we have, for any positive integer n and for k as an integer such that $0 \leq k \leq M/4-1$:

$$u_{k,n} = e^{j\frac{\pi}{2}n} \sum_{m=0}^{M-1} a_{m,n} e^{-j\frac{\pi}{2}m\frac{D-N}{N}} e^{j2\pi\frac{mk}{M}}$$

$$u_{k,n} = e^{j\frac{\pi}{2}n} \sum_{m=0}^{M-1} a_{m,n} e^{-j\frac{\pi}{2}m\frac{2qN-1-N}{N}} e^{j2\pi\frac{mk}{M}}$$

$$u_{k,n} = e^{j\frac{\pi}{2}n} \sum_{m=0}^{M-1} a_{m,n} (-1)^{mq} e^{j\frac{\pi m}{2}} e^{j\frac{\pi m}{2N}} e^{j2\pi\frac{mk}{M}}$$

More specifically, the following relationships are obtained between the values of the first half of the outputs of the IFFT:

$$u_{M/2-1-k,n} = e^{j\frac{\pi}{2}n} \sum_{m=0}^{M-1} a_{m,n} e^{-j\frac{\pi}{2}m\frac{D-N}{N}} e^{j2\pi\frac{m(M/2-1-k)}{M}}$$

$$u_{M/2-1-k,n} = e^{j\frac{\pi}{2}n} \sum_{m=0}^{M-1} a_{m,n} e^{-j\frac{\pi}{2}m\frac{2qN-1-N}{N}} e^{j\pi m} e^{-j\frac{2\pi m}{M}} e^{-j2\pi\frac{mk}{M}}$$

$$u_{M/2-1-k,n} = u_{k,n} = e^{j\frac{\pi}{2}n} \sum_{m=0}^{M-1} a_{m,n} (-1)^{mq} e^{j\frac{3\pi m}{2}} e^{-j\frac{\pi m}{2N}} e^{-j2\pi\frac{mk}{M}}$$

$$u_{M/2-1-k,n} = (-1)^n u_{k,n}^*$$

where the operator * corresponds to the conjugate operator
The following relationship is also written:

$$e^{j\frac{3\pi m}{2}} = \left(e^{j\frac{\pi m}{2N}}\right)^*.$$

For any positive integer n and for k as an integer such that $0\leq k\leq M/4-1$, we obtain the following relationships between the values of the second half of the outputs of the IFFT:

$$u_{3M/4-1-k,n} = e^{j\frac{\pi}{2}n}\sum_{m=0}^{M-1} a_{m,n}e^{-j\frac{\pi}{2}m\frac{D-N}{N}}e^{j2\pi\frac{m(3M/4-1-k)}{M}}$$

$$u_{3M/4-1-k,n} = e^{j\frac{\pi}{2}n}\sum_{m=0}^{M-1} a_{m,n}e^{-j\frac{\pi}{2}m\frac{2qN-1-N}{N}}e^{j\frac{3\pi}{2}m}e^{-j\frac{2\pi m}{M}}e^{-j2\pi\frac{mk}{M}}$$

$$u_{3M/4-1-k,n} = e^{j\frac{\pi}{2}n}\sum_{m=0}^{M-1} a_{m,n}(-1)^{mq}e^{-j\frac{\pi m}{2N}}e^{-j2\pi\frac{mk}{M}}$$

and:

$$u_{3M/4+k,n} = e^{j\frac{\pi}{2}n}\sum_{m=0}^{M-1} a_{m,n}e^{-j\frac{\pi}{2}m\frac{D-N}{N}}e^{j2\pi\frac{m(3M/4+k)}{M}}$$

$$u_{3M/4+k,n} = e^{j\frac{\pi}{2}n}\sum_{m=0}^{M-1} a_{m,n}e^{-j\frac{\pi}{2}m\frac{2qN-1-N}{N}}e^{j\frac{3\pi}{2}m}e^{j2\pi\frac{mk}{M}}$$

$$u_{3M/4+k,n} = e^{j\frac{\pi}{2}n}\sum_{m=0}^{M-1} a_{m,n}(-1)^{mq}e^{j\frac{\pi m}{2N}}e^{j2\pi\frac{mk}{M}}$$

$$u_{3M/4+k,n} = (-1)^n u^*_{3M/4-1-k,n}$$

Consequently, if we consider the relationships $u_{M/2-1-k,n}=(-1)^n u^*_{k,n}$ and $u_{3M/4+k,n}=(-1)^n u^*_{3M/4-1-k,n}$, it is enough according to the invention to:
- compute a first subset of outputs ($u_{k,n}$ and $u_{3M/4-1-k,n}$, for $0\leq k\leq M/4-1$) during the first sub-step 221,
- deduce therefrom the second subset of outputs ($u_{M/2-1-k,n}$ and $u_{3M/4+k,n}$, for $0\leq k\leq M/4-1$), complementary to the first subset during the second sub-step 222 in using the above-mentioned relationships, to thus obtain all the outputs of the frequency/time transformation step 22.

According to this example, it is thus enough to compute half of the outputs in using a partial or pruned Fourier transform (pruned IFFT) during the first sub-step 221 to obtain, at the end of the second sub-step 222, all the outputs of the frequency/time transformation step 22.

An efficient way of implementing the invention consists in computing, during the first sub-step 221, the outputs of the frequency/time transformation step 22 having same-parity indices. With this choice, no data is lost since the above-mentioned relationships enable the outputs with different parity indices to be linked two by two (for example if M equals 8 the output $u_{3,n}$ with odd-parity index is linked to the output $u_{0,n}$ with even-parity index according to the equation $u_{M/2-1-k,n}=(-1)^n u^*_{k,n}$).

By way of an example, we consider an OQAM multicarrier modulator implementing a frequency/time transformation with a size M equal to 32, as illustrated in FIG. 3.

If we consider the "classic" case implementing an IFFT using a split radix type algorithm, M outputs are computed from M inputs corresponding to the indices 0 to 31. Such an algorithm is expressed by an operational complexity corresponding to M log$_2$ M−3M+4 real multiplications and 3M log$_2$ M−3M+4 real additions.

According to the invention, rather than computing these M outputs, solely the first half of the outputs, corresponding to the outputs with even-parity indices, are computed. By using the above-mentioned relationships, it is then possible to deduce the second half of the outputs corresponding to the outputs with odd-parity indices since the above-mentioned relationships make it possible to link the outputs having different parity indices in sets of two.

This principle of reduction of complexity also applies if we consider a prototype filter with a length L=(2q+1)N. Indeed, in this case, the relationships between the different parity outputs are always verified but between different indices.

B) Second Example of Application: L=qM+q$_1$

Here below, we describe a second example of application of the invention, considering an OFDM/OQAM modulator having a prototype filter, the length of which is more generally of the form L=qM+q$_1$, with q and q$_1$ being integers such that q≥0 and 0≤q1≤M−1, and M is divisible by 4.

We then consider first of all the case where q1 is an even-parity value.

We can then write L=qM+2p, with, in a first case $0\leq p\leq M/4-1$.

In this case, if we develop a computation similar to that developed for the first example, for any positive integer n and for k as an integer such that $0\leq k\leq M/4+p-1$, we have:

$$u_{k,n} = e^{j\frac{\pi}{2}n}\sum_{m=0}^{M-1} a_{m,n}(-1)^{mq}e^{j\frac{\pi m}{2}}e^{j\frac{\pi m}{2N}}e^{j2\pi\frac{m(k-p)}{M}}$$

We therefore obtain the following relationships between the values of the first half of the outputs of IFFT:

$$u_{M/2+2p-k-1,n} = e^{j\frac{\pi}{2}n}\sum_{m=0}^{M-1} a_{m,n}(-1)^{mq}e^{j\frac{3\pi m}{2}}e^{-j\frac{\pi m}{2N}}e^{-j2\pi\frac{m(k-p)}{M}}$$

$$u_{M/2+2p-k-1,n} = (-1)^n u^*_{k,n}$$

For any positive integer n and for k as an integer such that $0\leq k\leq M/4-p-1$, we obtain the following relationships between the values of the second half of the outputs of the IFFT:

$$u_{3M/4+p+k,n} = e^{j\frac{\pi}{2}n}\sum_{m=0}^{M-1} a_{m,n}(-1)^{mq}e^{j\frac{\pi m}{2N}}e^{j2\pi\frac{mk}{M}}$$

$$u_{3M/4+p-k-1,n} = e^{j\frac{\pi}{2}n}\sum_{m=0}^{M-1} a_{m,n}(-1)^{mq}e^{-j\frac{\pi m}{2N}}e^{-j2\pi\frac{mk}{M}}$$

$$u_{3M/4+p-k-1,n} = (-1)^n u^*_{3M/4+p+k,n}$$

As a consequence, considering the relationships $u_{M/2+2p-k-1,n}=(-1)^n u^*_{k,n}$ and $u_{3M/4+p-k-1,n}=(-1)^n u^*_{3M/4+p+k,n}$, it is enough according to the invention to:
- compute the first subset of the outputs ($u_{k,n}$ for $0\leq k\leq M/4+p-1$, and $u_{3M/4+p+k,n}$ for $0\leq k\leq M/4-p-1$) during the first sub-step 221;
- deduce therefrom a second subset of the outputs ($u_{M/2+2p-k-1,n}$ for $0\leq k\leq M/4+p-1$ and $u_{3M/4+p-k-1,n}$ for $0\leq k\leq M/4-p-1$) complementary to the first subset during the second sub-step 222 in using the above-mentioned relationships, to thus obtain all the outputs of the frequency/time transformation step 22.

It is also possible to write L=qM+2p, with, in a second case M/4≤p≤M/2−1.

In this case, if we develop a computation similar to the previous one for any positive integer n and for k an integer such that 0≤k≤p−M/4−1, we have:

$$u_{k,n} = e^{j\frac{\pi}{2}n} \sum_{m=0}^{M-1} a_{m,n}(-1)^{mq} e^{j\frac{\pi m}{2}} e^{j\frac{\pi m}{2N}} e^{j2\pi\frac{m(k-p)}{M}}$$

We therefore obtain the following relationships between the values of the first half of the outputs of the IFFT:

$$u_{2p-M/2-k-1,n} = e^{j\frac{\pi}{2}n} \sum_{m=0}^{M-1} a_{m,n}(-1)^{mq} e^{j\frac{\pi m}{2}} e^{j\frac{\pi m}{2N}} e^{-j\frac{2\pi m}{2N}} e^{j2\pi\frac{m(2p-M/2-k-1)}{M}}$$

$$u_{2p-M/2-k-1,n} = e^{j\frac{\pi}{2}n} \sum_{m=0}^{M-1} a_{m,n}(-1)^{mq} e^{-j\frac{\pi m}{2}} e^{-j\frac{\pi m}{2N}} e^{j2\pi\frac{m(p-k)}{M}}$$

$$u_{2p-M/2-k-1,n} = (-1)^n u_{k,n}^*$$

For any positive integer n and for k as an integer such that 0≤k≤3M/4−p−1, we obtain the following relationships between the values of the second half of the outputs of the IFFT:

$$u_{2p+k-M/2,n} = e^{j\frac{\pi}{2}n} \sum_{m=0}^{M-1} a_{m,n}(-1)^{mq} e^{j\frac{\pi m}{2}} e^{j\frac{\pi m}{2N}} e^{-j\frac{2\pi mp}{2N}} e^{j2\pi\frac{m(2p+k-M/2)}{M}}$$

$$u_{2p+k-M/2,n} = e^{j\frac{\pi}{2}n} \sum_{m=0}^{M-1} a_{m,n}(-1)^{mq} e^{-j\frac{\pi m}{2}} e^{j\frac{\pi m}{2N}} e^{j2\pi\frac{m(2p+k)}{M}}$$

And $$u_{M-1-k,n} = e^{j\frac{\pi}{2}n} \sum_{m=0}^{M-1} a_{m,n}(-1)^{mq} e^{j\frac{\pi m}{2N}} e^{-j\frac{2\pi mp}{2N}} e^{j2\pi\frac{m(M-1-k)}{M}}$$

$$u_{M-1-k,n} = e^{j\frac{\pi}{2}n} \sum_{m=0}^{M-1} a_{m,n}(-1)^{mq} e^{-j\frac{\pi m}{2N}} e^{-j2\pi\frac{m(k+p)}{M}}$$

$$u_{M-1-k,n} = (-1)^n u_{2p+k-M/2,n}^*$$

As a consequence, considering the relationships $u_{2p-M/2-k-1,n} = (-1)^n u^*_{k,n}$ and $u_{M-1-k,n} = (-1)^n u^*_{2p+k-M/2,n}$, it is enough according to the invention to:

compute a first subset of the outputs ($u_{k,n}$ for 0≤k≤p−M/4−1, and $u_{2p+k-M/2,n}$ for 0≤k≤3M/4−p−1) during the first sub-step 221;

deduce therefrom a second subset of the outputs ($u_{2p-M/2-k-1,n}$ for 0≤k≤p−M/4−1 and $u_{M-1-k,n}$ for 0≤k≤3M/4−p−1) complementary to the first subset during the second sub-step 222 in using the above-mentioned relationships, to thus obtain all the outputs of the frequency/time transformation step 22.

According to this example, it is thus enough to compute half of the outputs in using a partial Fourier transform during the first sub-step 221 to obtain, at the end of the second sub-step 222, all the outputs of the frequency/time transformation step 22.

Again, it is observed that the above-mentioned relationships enable the outputs with different parity indices to be linked in sets of two.

As described with reference to the first example, an efficient way of implementing the invention consists in computing, during the first sub-step 221, the outputs of the frequency/time transformation step 22 having same-parity indices, for example the outputs with even-parity indices, and then, from this value, deducing the outputs with odd-parity indices.

The principle of reducing complexity, applied to the case where the length of the prototype filter is a multiple of the size of the transformation operation (L=qM) according to the first example, therefore remains valid when L=qM+2p.

This principle of reduction of complexity is implemented differently when $q_1$ is an odd-parity value.

Indeed, in this case, it is possible to write L=qM+2p+1, and the outputs of the transformation module can be expressed in the following form for 0≤k≤M−1:

$$u_{k,n} = e^{j\frac{\pi}{2}n} \sum_{m=0}^{M-1} a_{m,n}(-1)^{mq} e^{j\frac{\pi m}{2}} e^{j2\pi\frac{m(k-p)}{M}}$$

As proposed in the patent FR-97 08547 filed on Jan. 7, 1997 and entitled "Method and device for modulating a multicarrier signal of the OFDM/OQAM type, and corresponding demodulation method and device", the outputs of the transformation module can be obtained by means of an IFFT taking at input real values ($a_{m,n}(-1)^{mq}$), and by applying a circular permutation to the output. This permutation is a circular leftward shift by M/4−p if 0≤p≤M/4−1 and a circular rightward shift by p−M/4 if M/4≤p≤M/2−1. In other words, if we take the case where 0≤p≤M/4−1, the output of the IFFT corresponding to the index 0 replaces the output corresponding to the index M/4−p, the output corresponding to the index 1 replaces the output corresponding to the index M/4−p+1, etc.

In this case, the reduction of complexity comes from the fact of the possibility of using an IFFT on the real and non-complex inputs. In using a split-radix type algorithm as presented here above, the operational complexity is therefore reduced by half.

It can also be noted that the previous expression takes account of the length of the prototype filter and therefore makes it possible to directly obtain a causal result, which is not the case in the above-mentioned patent.

5.3 Case of the BFDM/OQAM Modulator

The method according to the invention can also be implemented in a BFDM/OQAM modulator for which the prototype filters used in transmission and in reception can be different. The principle of reduction of complexity, described here above for the OFDM/OQAM orthogonal case, can therefore also be applied to the bi-orthogonal case.

In this case, the delay parameter D, used at input of the frequency/time transformation module, is more flexible and can be such that D≤L−1, with L being the length of the prototype transmission filter.

A) D=L−1

If we consider first of all a delay such that D=L−1, we obtain at output of the frequency/time transformation module the relationships defined here above in the second example of application if $q_1$ is an even-parity number, namely:

$$u_{M/2+2p-k-1,n} = (-1)^n u^*_{k,n} \text{ for } 0 \le k \le M/4+p-1$$

$$u_{3M/4+p-k-1,n} = (-1)^n u^*_{3M/4+p+k,n} \text{ for } 0 \le k \le M/4-p-1.$$

with 0≤p≤M/4−1.

And for the second case when $M/4 \le p \le M/2-1$ $$u_{2p-M/2-k-1,n} = (-1)^n u^*_{k,n} \text{ for } 0 \le k \le p-M/4-1$$

$$u_{M-1-k,n} = (-1)^n u^*_{2p+k-M/2,n} \text{ for } 0 \le k \le 3M/4-p-1$$

B) D<L−1

If the delay is such that D<L−1, these relationships differ, depending on the form of the delay.

More specifically, we write $D=qM+q_1-1$, and study the different cases:

if $q_1$ is an even-parity number, then the delay has the form $D=qM+2p-1$ and the relationships defined here above in the second example of application where L=qM+2p are found again;

if $q_1$ is an odd-parity number then the delay has the form $D=qM+2p$ and the relationships defined here above in the second example of application when L=qM+2p+1 are found again. Two cases are to be considered according to the interval of values of p.

a. If $0 \le p \le M/4-1$, the outputs of the transformation module can be obtained by using a real transformation followed by a circular leftward permutation by M/4−p;

b. If $M/4 \le p \le M/2-1$, the outputs of the transformation module can be obtained by using a real transformation followed by a rightward circular permutation by p−M/4.

By way of an example, we consider a BFDM/OQAM type modulator implementing a linear phase prototype filter in transmission having a length L and a delay D strictly smaller than L−1.

If the delay has the form $D=qM+2p-1$, with $$2p = \frac{M}{2} = N,$$

then in using the equations of section 5.3 B), we obtain a relationship between the outputs having indices k and M−1−k of the frequency/time transformation module.

More specifically, for the second case where $M/4 \le p \le 3M/4-1$, the first relationship obtained for $0 \le k \le p-M/4-1$ leads to an impossible case ($0 \le k \le -1$), and it therefore cannot be applied. By contrast, the second relationship obtained for $0 \le k \le 3M/4-p-1$ applies and leads to $u_{M-1-k,n} = (-1)^n u^*_{k+2p-M/2,n} = (-1)^n u^*_{k,n}$ for $0 \le k \le M/2-1$.

Consequently, considering the relationship $u_{M-1-k,n} = (-1)^n u^*_{k,n}$, is enough according to the invention to:

compute a first subset of the outputs ($u_{k,n}$ for $0 \le k \le M/2-1$) during the first sub-step 221;

deduce from this a second subset of the outputs ($u_{M-1-k,n}$ for $0 \le k \le M/2-1$), complementary to the first subset, during the second sub-step 222, in using the above-mentioned relationship, to thus obtain all the outputs of the frequency/time transformation step 22.

C) Simplification of Polyphase Filtering

Once again, the description is situated in the context of a BFDM/OQAM modulator implementing a linear phase prototype filter in transmission having a length L, the delay of which is chosen such that $D=qN-1$, with $q=2q'+1$ and q' as an integer.

It may be recalled that classically the polyphase components $G_l(z)$ of the prototype filter h[n] are defined by $$G_l(z) = \sum_n h[l+nM] z^{-n}$$

However, since the prototype filter in transmission is a linear phase filter, it is deduced therefrom that its polyphase components can be expressed in the following form for $0 \le k \le M/2-1$:

$$G_k(z) = z^{-(q-1)} G_{M-1-k}(z^{-1}).$$

The polyphase components are therefore para-conjugate. The implementing of this polyphase filter can then be simplified. The use of this symmetry makes it possible to halve the number of multiplications to be performed for a prototype filter.

More specifically, the outputs of the frequency/time transformation module are linked by the relationship $u_{M-1-k,n} = (-1)^n u^*_{k,n}$. The outputs of the frequency/time transformation module are therefore conjugate in sets of two and filtered by para-conjugate polyphase components. It is therefore deduced therefrom that there are multiplications that are common but at different instants of filtering. The number of these common multiplications during the filtering is equal to half of the overall multiplications and therefore it is possible to halve the number of multiplications during this phase.

It is necessary however to note that an additional memory is needed to store the multiplications at each instant of filtering.

FIG. 5 provides a more precise illustration of the use of such a memory.

By way of an example, we consider only two outputs $u_{k,n}$ and $u_{M-1-k,n}$ of the mathematical transformation module 22 at two different instants 2n and 2n+1. We also consider a prototype filter with a length L=qM=2M. Each polyphase component $G_k(z)$ is therefore formed by two coefficients (h(0) and h(1)). It can be noted that the multiplication by a zero coefficient is linked to the filtering which is done at a double rate by $G_k(z^2)$.

According to this example it is noted that, at the output of the component $G_k(z^2)$ of the polyphase filter, the following filtered symbols are obtained:

$$u_{k,2n} h(0), u_{k,2n+1} h(0), u_{k,2n} h(1), u_{k,2n+1} h(1)$$

At the output of the component $G_{M-1-k}(z^2)$ from the polyphase filter, the following filtered symbols are obtained:

$$u^*_{k,2n} h(1), u^*_{k,2n+1} h(1), u^*_{k,2n} h(0), u^*_{k,2n+1} h(0)$$

Indeed, it may be recalled that the outputs of the frequency/time transformation module are linked by the relationship $u_{M-1-k,n} = (-1)^n u^*_{k,n}$ and the polyphase components are linked by the relationship $G_k(z) = z^{-(q-1)} G_{M-1-k}(z^{-1})$, for $0 \le k \le M/2-1$.

There is therefore a redundancy in the information to be computed and the filtering complexity can be reduced by half. More specifically, it is possible to compute the filtered symbols $u_{k,2n} h(0)$, $u_{k,2n+1} h(0)$, $u^*_{k,2n} h(1)$ and $u^*_{k,2n+1} h(1)$ and store them in a memory 51 and then use this memory to determine the filtered symbols $u_{k,2n} h(1)$, $u_{k,2n+1} h(1)$, $u^*_{k,2n} h(0)$ and $u^*_{k,2n+1} h(0)$.

In other words, if we consider a prototype filter with a length L=qM and a delay D=q'N−1, with q'=2q"+1, and q"<q, the number of complex multiplications is equal to 2qM (instead of 4qM).

5.3 Modification of the Phase Term

In the examples presented here above in the case of an OFDM/OQAM or BFDM/OQAM modulation, the phase term was chosen such that $$\phi_{m,n} = \frac{\pi}{2}(m+n) + \varepsilon\pi mn,$$

Naturally, the invention can also be applied for a phase term such that $$\phi_{m,n} = \frac{\pi}{2}(m+n).$$

with $\varepsilon \in \{0,1,-1\}$.

More generally, the phase term $\phi_{m,n}$ can be chosen so that the phase difference between a position (m,n) of the time/frequency plane and the four closest neighboring positions $\{(m+1,n),(m-1,n),(m,n+1),(m,n-1)\}$ is equal to $\pm\pi/2$.

5.4 Performance in Terms of Complexity

As presented in the examples here above, it is enough to compute a first subset of outputs of the frequency/time transformation module to obtain all the outputs of this module. For example, it is enough to compute the outputs with even-parity index of the frequency/time transformation module.

By using the principle of pruning or partial transform, it is therefore possible to reduce the complexity of most of the IFFT type fast algorithms that are used in practice to implement this frequency/time transformation.

By way of an illustration, reference is made again to FIG. 3 in order to illustrate the method proposed in the case of the split radix IFFT algorithm of the decimation-in-frequency (DIF) type.

It can be recalled first of all that:

for a transformation sized $M=2^r$, we have r computation stages. According to the example illustrated in FIG. 3, there are five computation stages (M=32 and r=5);

the computations necessary at each stage comprise complex additions and multiplications which are symbolized by the repetitive structure of FIG. 3 in with a butterfly shape, with the notations illustrated in FIG. 4, where $$W_M = e^{j\frac{2\pi}{M}}$$

for one IFFT and $$W_M = e^{-j\frac{2\pi}{M}}$$

for an FFT;

for this DIF type algorithm, the outputs with even-parity index are obtained at the upper part of the IFFT.

As already indicated, it is enough according to the invention to compute the outputs with even-parity index of the frequency/time transformation module (giving M/2 first outputs) to be able to obtain all the outputs of the transformation module whether the module considered is an OFDM/OQAM modulator or a BFDM/OQAM modulator.

It is shown here below that the operating cost for a pruned IFFT with a size M is reduced to that of a non-pruned IFFT with a size M/2 plus M/2 complex additions. This can be verified by sight in FIG. 3 where it can be seen that it is possible to eliminate the entire lower half classically used to compute the outputs with odd-parity index.

The following demonstration is applied to an FFT but can be deduced dually for an IFFT.

More specifically, for a temporal sequence x(m) with m=0, ..., M-1, the FFT is given by:

$$X(k) = \sum_{m=0}^{M-1} x(m) W_M^{mk},$$

for $k = 0, \ldots, M-1$, with $W_M = e^{-j\frac{2\pi}{M}}$.

According to the document "*Implementation of "split-radix" FFT algorithms for complex, real, and real symmetric data*" mentioned here above, this equation can be broken down in the following form:

$$\begin{cases} X(2k) = \sum_{m=0}^{M/2-1} (x(m) + x(m+M/2))W_{M/2}^{mk} \\ X(4k+1) = \sum_{m=0}^{M/4-1} [x_R(m) + jx_I(m)]W_M^m W_{M/4}^{mk} \\ X(4k+3) = \sum_{m=0}^{M/4-1} [x_R(m) - jx_I(m)]W_M^{3m} W_{M/4}^{mk} \end{cases}$$

with $x_R(m) = (x(m) - x(m+M/2))$ and
$x_I(m) = (x(m+M/4) - x(m+3M/4))$.

This decimation in frequency enables the breakdown of an FFT sized M into an FFT sized M/2 and two FFTs sized M/4. It can be noted that, at each breakdown, the computation of the odd-parity frequencies has a cost of:

M/2-4 complex multiplications (the multiplication by $W_M^m$ and $W_M^{3m}$ for $m \neq \{0,M/8\}$), where a complex multiplication $M_c$ is equivalent to two real multiplications $M_r$ and three real additions $A_r$, and two multiplications by the eighth root of unity, where each multiplication is equivalent to two real multiplications $M_r$ and two real additions $A_r$.

It can be noted that it is preferable to compute the even-parity frequencies because they require fewer computations than the odd-parity frequencies.

According to the equation of the FFT expressed in the form (X(2k),X(4k+1), X(4k+3)), the cost for computing the even-parity frequencies is equivalent to computing an FFT sized M/2 (i.e. only the coefficients X(2k)) as well as M/2 complex additions to obtain the inputs of this FFT (x(m)+x(m+M/2), for m=0, ..., M/2-1).

Now it is known that the complexity for computing an FFT sized M in using the "split radix" type algorithm is equal to $(M\log_2 M - 3M + 4)$ real multiplications and $(3M\log_2 M - 3M + 4)$ real additions.

Hence, computing an FFT sized M/2 with M/2 complex additions at the input instead of an FFT sized M reduces the complexity from $(M\log_2 M - 3M + 4)$ to $((M/2)\log_2 M - 2M + 4)$ real multiplications giving a gain of over 50%, and from $(3M\log_2 M - 3M + 4)$ to $((3M/2)\log_2 M - 2M + 4)$ real additions, giving again a gain of over 50%.

In dual manner, computing a partial IFFT sized M/2 according to the invention instead of an IFFT sized M according to the prior art reduces the complexity from $(M\log_2 M - 3M + 4)$ to $((M/2)\log_2 M - 2M + 4)$ real multiplications and from $(3M\log_2 M - 3M + 4)$ to $((3M/2)\log_2 M - 2M + 4)$ real additions.

5.5 Structure of the Modulator

Finally, referring to FIG. 6, we present the simplified structure of an OFDM/OQAM or BFDM/OQAM modulator implementing a technique of modulation according to an example of application described here above.

Such a modulator comprises a memory 61 comprising a buffer memory, a processing unit 62 equipped for example with a microprocessor μP, and driven by the computer program 63 implementing the method of modulation according to the invention.

At initialization, the code instructions of the computer program 63 are loaded for example into a RAM and then executed by the processor of the processing unit 62. The processing unit 62 inputs M real data symbols $a_{m,n}$. The microprocessor of the processing unit 62 implements the steps of the method of modulation described here above, according to the instructions of the computer program 63 to perform a transformation, from the frequency domain into the time domain, of the data symbols delivering transformed symbols $u_{m,n}$. To this end, the modulator comprises, in addition to the buffer memory 61, means of partial transformation of the set of M real data symbols, implementing a partial Fourier transform and delivering a first subset of C transformed symbols, with C strictly smaller than M, and means for obtaining, from the first subset, a second subset of (M-C) transformed symbols, complementary to the first subset.

These means are driven by the microprocessor of the processing unit 62.

The invention claimed is:

1. A method of modulation delivering an OQAM type multicarrier signal, comprising:

implementing by a modulator device a step of transformation, from the frequency domain to the time domain, of a set of M real data symbols delivering a set of M transformed symbols, called a complete transformation step, said complete transformation step comprising the following sub-steps performed by the modulator device:

applying a partial Fourier transform to the set of M real data symbols delivering a first subset of C transformed symbols of said set of M transformed symbols with C being strictly smaller than M; and obtaining, from said first subset, a second subset of (M-C) transformed symbols of said set of M transformed symbols, said second subset of (M-C) transformed symbols being the subset complementary to said first subset of C transformed symbols of said set of M transformed symbols, wherein obtaining determines a first part of said second subset from a first part of said first subset, in using a first mathematical relationship, and determines a second part of said second subset from a second part of said first subset, in using a second mathematical relationship, and wherein said first and second parts of said first subset, and said second subset respectively are complementary, wherein, for a prototype filter with a length L equal to qM+2p, with q and p being integers such that q≥0 and 0≤p≤M/2−1 and M divisible by 4, if 0≤p≤M/4−1, then said first mathematical relationship is expressed in the form $u_{M/2+2p-k-1,n} = (-1)^n u_{k,n}^*$, for an integer k such that 0≤k≤M/4+p−1 and said second mathematical relationship is expressed in the form $u_{3M/4+p-k-1,n} = (-1)^n u_{3M/4+p+k,n}^*$, for an integer k such that 0≤k≤M/4−p−1, else if M/4≤p≤M/2−1, then said first mathematical relationship is expressed in the form $u_{2p-M/2-k-1,n} = (-1)^n u_{k,n}^*$, for an integer k such that 0≤k≤p−M/4−1 and said second mathematical relationship is expressed in the form $u_{M-k-1,n} = (-1)^n u_{2p-M/2+k,n}^*$, for an integer k such that 0≤k≤3M/4−p−1, with:

$u_{m,n}$ a transformed symbol associated with the output with index m of the complete transformation step at an instant n;

\* the conjugate operator.

2. The method of modulation according to claim 1, wherein said first and second subsets have an identical size.

3. The method of modulation according to claim 1, wherein said first subset comprises the transformed symbols associated with the outputs with same-parity index of said complete transformation step.

4. The method of modulation according to claim 1, wherein the method comprises a step of pre-processing said real data symbols implemented preliminarily to said complete transformation step.

5. A method of modulation delivering an OQAM type multicarrier signal, comprising:

implementing by a modulator device a step of transformation, from the frequency domain to the time domain, of a set of M real data symbols delivering a set of M transformed symbols, called a complete transformation step, said complete transformation step comprising the following sub-steps performed by the modulator device:

applying a partial Fourier transform to the set of M real data symbols delivering a first subset of C transformed symbols of said set of M transformed symbols with C being strictly smaller than M; and obtaining, from said first subset, a second subset of (M-C) transformed symbols of said set of M transformed symbols, said second subset of (M-C) transformed symbols being the subset complementary to said first subset of C transformed symbols of said set of M transformed symbols, wherein obtaining determines a first part of said second subset from a first part of said first subset, in using a first mathematical relationship, and determines a second part of said second subset from a second part of said first subset, in using a second mathematical relationship, and wherein said first and second parts of said first subset, and said second subset respectively are complementary, wherein, for a prototype filter with a length L and a delay parameter D strictly smaller than L−1, such that D=qM+2p−1, with L being the length of the prototype filter, q and p being integers such that q≤0 and 0≤p≤M/2−1, and M divisible by 4, if 0≤p≤M/4−1 then said first mathematical relationship is expressed in the form $u_{M/2+2p-k-1,n} = (-1)^n u_{k,n}^*$, for an integer k such that 0≤k≤M/4+p−1 and said second mathematical relationship is expressed in the form $u_{3M/4+p-k-1,n} = (-1)^n u_{3M/4+p+k,n}^*$ for an integer k such that 0≤k≤M/4−p−1, else if M/4≤p≤M/2−1, then said first mathematical relationship is expressed in the form $u_{2p-M/2-k-1,n} = (-1)^n u_{k,n}^*$, for an integer k such that 0≤k≤p−M/4−1 and said second mathematical relationship is expressed in the form $u_{M-1-k,n} = (-1)^n u_{2p+k-M/2,n}$ for an integer k such that 0≤k≤3M/4−p−1, with:

$u_{m,n}$ a transformed symbol associated with the output with index m of the complete transformation step at an instant n;

\* the conjugate operator.

6. The method of modulation according to claim 5, wherein said first and second subsets have an identical size.

7. The method of modulation according to claim 5, wherein said first subset comprises the transformed symbols associated with the outputs with same-parity index of said complete transformation step.

8. The method of modulation according to claim 5, wherein the method comprises a step of pre-processing said real data symbols implemented preliminarily to said complete transformation step.

9. A method of modulation delivering an OQAM type multicarrier signal, comprising:
  implementing by a modulator device a step of transformation, from the frequency domain to the time domain, of a set of M real data symbols delivering a set of M transformed symbols, called a complete transformation step,
  said complete transformation step comprising the following sub-steps performed by the modulator device:
  applying a partial Fourier transform to the set of M real data symbols delivering a first subset of C transformed symbols of said set of M transformed symbols with C being strictly smaller than M; and
  obtaining, from said first subset, a second subset of (M-C) transformed symbols of said set of M transformed symbols, said second subset of (M-C) transformed symbols being the subset complementary to said first subset of C transformed symbols of said set of M transformed symbols,
  wherein, for a linear phase prototype filter with a length L and a delay parameter D strictly smaller than L-1, such that $D=qM/2-1$, with $q=2q'+1$, q' an integer and M is divisible by 2,
  said step of obtaining determines said second subset from said first subset, in using the mathematical relationship:

$$u_{M-1-k,n} = (-1)^n u_{k,n}^*,$$

for an integer k such that $0 \leq k \leq M/2-1$
with:
  $u_{m,n}$ a transformed symbol associated with the output with index m of the complete transformation step at an instant n;
  * the conjugate operator;
  and wherein the method comprises a step of polyphase filtering of said M transformed symbols by using said prototype filter implementing polyphase components such that $G_k(z) = z^{-(q-1)} G_{M-1-k}(z^{-1})$ for $0 \leq k \leq M/2-1$ 10. The method of modulation according to claim 9, wherein said first and second subsets have an identical size.

11. The method of modulation according to claim 9, wherein said first subset comprises the transformed symbols associated with the outputs with same-parity index of said complete transformation step.

12. The method of modulation according to claim 9, wherein the method comprises a step of pre-processing said real data symbols implemented preliminarily to said complete transformation step.

13. A modulator device for performing a modulation, delivering an OQAM type multicarrier signal, the modulator device comprising:
  means for implementing a transformation, from the frequency domain to the time domain, of a set of M real data symbols delivering a set of M transformed symbols, called a complete transformation,
  said means for implementing the complete transformation comprising:
  means for applying a partial Fourier transform to the set of M real data symbols delivering a first subset of C transformed symbols of said set of M transformed symbols with C being strictly smaller than M; and
  means for obtaining, from said first subset, a second subset of (M-C) transformed symbols of said set of M transformed symbols, said second subset of (M-C) transformed symbols being the subset complementary to said first subset of C transformed symbols of said set of M transformed symbols, wherein obtaining determines a first part of said second subset from a first part of said first subset, in using a first mathematical relationship, and determines a second part of said second subset from a second part of said first subset, in using a second mathematical relationship, and wherein said first and second parts of said first subset, and said second subset respectively are complementary,
  wherein, for a prototype filter with a length L equal to $qM+2p$, with q and p being integers such that $q \geq 0$ and $0 \leq p \leq M/2-1$ and M divisible by 4,
  if $0 \leq p \leq M/4-1$, then said first mathematical relationship is expressed in the form $u_{M/2+2p-k-1,n} = (-1)^n u_{k,n}^*$, for an integer k such that $0 \leq k \leq M/4+p-1$ and
  said second mathematical relationship is expressed in the form $u_{3M/4+p-k-1,n} = (-1)^n u_{3M/4+p+k,n}^*$, for an integer k such that $0 \leq k \leq M/4-p-1$,
  else if $M/4 \leq p \leq M/2-1$, then said first mathematical relationship is expressed in the form $u_{2p-M/2-k-1,n} = *(-1)^n u_{k,n}^*$, for an integer k such that $0 \leq k \leq p-M/4-1$ and
  said second mathematical relationship is expressed in the form $u_{M-k-1,n} = (-1)^n u_{2p-M/2+k,n}^*$, for an integer k such that $0 \leq k \leq 3M/4-p-1$,
with:
  $u_{m,n}$ a transformed symbol associated with the output with index m of the complete transformation at an instant n;
  * the conjugate operator.

14. A modulator device for performing a modulation, delivering an OQAM type multicarrier signal, the modulator device comprising:
  means for implementing a transformation, from the frequency domain to the time domain, of a set of M real data symbols delivering a set of M transformed symbols, called a complete transformation,
  said means for implementing the complete transformation comprising:
  means for applying a partial Fourier transform to the set of M real data symbols delivering a first subset of C transformed symbols of said set of M transformed symbols with C being strictly smaller than M; and
  means for obtaining, from said first subset, a second subset of (M-C) transformed symbols of said set of M transformed symbols, said second subset of (M-C) transformed symbols being the subset complementary to said first subset of C transformed symbols of said set of M transformed symbols, wherein obtaining determines a first part of said second subset from a first part of said first subset, in using a first mathematical relationship, and determines a second part of said second subset from a second part of said first subset, in using a second mathematical relationship, and wherein said first and second parts of said first subset, and said second subset respectively are complementary,
  wherein, for a prototype filter with a length L and a delay parameter D strictly smaller than L-1, such that $D=qM+2p-1$, with L being the length of the prototype filter, q and p being integers such that $q \geq 0$ and $0 \leq p \leq M/2-1$, and M divisible by 4, if $0 \leq p \leq M/4-1$ then said first mathematical relationship is expressed in the form $u_{M/2+2p-k-1,n}=(-1)^n u_{k,n}^*$, for an integer k such that $0 \leq k \leq M/4+p-1$ and said second mathematical relationship is expressed in the form $u_{3M/4+p-k-1,n}=(-1)^n u_{3M/4+p+k,n}^*$, for an integer k such that $0 \leq k \leq M/4-p-1$, else if $M/4 \leq p \leq M/2-1$, then said first mathematical relationship is expressed in the form $u_{2p-M/2-k-1,n}=(-1)^n u_{k,n}^*$, for an integer k such that $0 \leq k \leq p-M/4-1$ and said second mathematical relationship is expressed in the form $u_{M-1-k,n}=(-1)^n u_{2p+k-M/2,n}^*$ for an integer k such that $0 \leq k \leq 3M/4-p-1$, with:
$u_{m,n}$ a transformed symbol associated with the output with index m of the complete transformation at an instant n;
* the conjugate operator.

15. A modulator device for performing a modulation, delivering an OQAM type multicarrier signal, the modulator device comprising:

means for implementing a transformation, from the frequency domain to the time domain, of a set of M real data symbols delivering a set of M transformed symbols, called a complete transformation, said complete transformation comprising:

applying a partial Fourier transform to the set of M real data symbols delivering a first subset of C transformed symbols of said set of M transformed symbols with C being strictly smaller than M; and obtaining, from said first subset, a second subset of (M-C) transformed symbols of said set of M transformed symbols, said second subset of (M-C) transformed symbols being the subset complementary to said first subset of C transformed symbols of said set of M transformed symbols, wherein, for a linear phase prototype filter with a length L and a delay parameter D strictly smaller than L-1, such that $D=qM/2-1$, with $q=2q'+1$, q' an integer and M is divisible by 2, said obtaining determines said second subset from said first subset, in using the mathematical relationship:

$$u_{M-1-k,n}=(-1)^n u_{k,n}^*,$$

for an integer k such that $0 \leq k \leq M/2-1$ with:
$u_{m,n}$ a transformed symbol associated with the output with index m of the complete transformation step at an instant n;
* the conjugate operator;

and means for polyphase filtering of said M transformed symbols by using said prototype filter implementing polyphase components such that $G_k(z)=z^{-(q-1)}G_{M-1-k}(z^{-1})$ for $0 \leq k \leq M/2-1$.

16. A non-transitory computer-readable medium comprising a computer program stored thereon, which comprises instructions to perform a method of modulation delivering an OQAM type multicarrier signal, when said program is executed by a processor of a modulating device, wherein the instructions configure the modulating device to perform the following acts:

implementing a transformation, from the frequency domain to the time domain, of a set of M real data symbols delivering a set of M transformed symbols, called a complete transformation step, said complete transformation step comprising the following acts:

applying a partial Fourier transform to the set of M real data symbols delivering a first subset of C transformed symbols of said set of M transformed symbols with C being strictly smaller than M; and obtaining, from said first subset, a second subset of (M-C) transformed symbols of said set of M transformed symbols, said second subset of (M-C) transformed symbols being the subset complementary to said first subset of C transformed symbols of said set of M transformed symbols, wherein obtaining determines a first part of said second subset from a first part of said first subset, in using a first mathematical relationship, and determines a second part of said second subset from a second part of said first subset, in using a second mathematical relationship, and wherein said first and second parts of said first subset, and said second subset respectively are complementary, wherein, for a prototype filter with a length L equal to $qM+2p$, with q and p being integers such that $q \geq 0$ and $0 \leq p \leq M/2-1$ and M divisible by 4, if $0 \leq p \leq M/4-1$, then said first mathematical relationship is expressed in the form $u_{M/2+2p-k-1,n}=(-1)^n u_{k,n}^*$, for an integer k such that $0 \leq k \leq M/4+p-1$ and said second mathematical relationship is expressed in the form $u_{3M/4+p-k-1,n}=(-1)^n u_{3M/4+p+k,n}^*$, for an integer k such that $0 \leq k \leq M/4-p-1$, else if $M/4 \leq p \leq M/2-1$, then said first mathematical relationship is expressed in the form $u_{2p-M/2-k-1,n}=*(-1)^n u_{k,n}^*$, for an integer k such that $0 \leq k \leq p-M/4-1$ and said second mathematical relationship is expressed in the form $u_{M-k-1,n}=(-1)^n u_{2p-M/2+k,n}^*$, for an integer k such that $0 \leq k \leq 3M/4-p-1$, with:
$u_{m,n}$ a transformed symbol associated with the output with index m of the complete transformation at an instant n;
* the conjugate operator.

17. A non-transitory computer-readable medium comprising a computer program stored thereon, which comprises instructions to perform a method of modulation delivering an OQAM type multicarrier signal, when said program is executed by a processor of a modulating device, wherein the instructions configure the modulating device to perform the following acts:

implementing a transformation, from the frequency domain to the time domain, of a set of M real data symbols delivering a set of M transformed symbols, called a complete transformation step, said complete transformation step comprising:

applying a partial Fourier transform to the set of M real data symbols delivering a first subset of C transformed symbols of said set of M transformed symbols with C being strictly smaller than M; and obtaining, from said first subset, a second subset of (M-C) transformed symbols of said set of M transformed symbols, said second subset of (M-C) transformed symbols being the subset complementary to said first subset of C transformed symbols of said set of M transformed symbols, wherein obtaining determines a first part of said second subset from a first part of said first subset, in using a first mathematical relationship, and determines a second part of said second subset from a second part of said first subset, in using a second mathematical relationship, and wherein said first and second parts of said first subset, and said second subset respectively are complementary, wherein, for a prototype filter with a length L and a delay parameter D strictly smaller than L-1, such that $D=qM+$ 2p−1, with L being the length of the prototype filter, q and p being integers such that q≥0 and 0≤p≤M/2−1, and M divisible by 4, if 0≤p≤M/4−1 then said first mathematical relationship is expressed in the form $u_{M/2+2p-k-1,n}=(-1)^n u_{k,n}^*$, for an integer k such that 0≤k≤M/4+p−1 and said second mathematical relationship is expressed in the form $u_{3M/4+p-k-1,n}=(-1)^n u_{3M/4+p+k,n}^*$, for an integer k such that 0≤k≤M/4−p−1, else if M/4≤p≤M/2−1, then said first mathematical relationship is expressed in the form $u_{2p-M/2-k-1,n}=(-1)^n u_{k,n}^*$, for an integer k such that 0≤k≤p−M/4−1 and said second mathematical relationship is expressed in the form $u_{M-1-k,n}=(-1)^n u_{2p+k-M/2,n}^*$ for an integer k such that 0≤k≤3M/4−p−1, with:
  $u_{m,n}$ a transformed symbol associated with the output with index m of the complete transformation step at an instant n;
  * the conjugate operator.

18. A non-transitory computer-readable medium comprising a computer program stored thereon, which comprises instructions to perform a method of modulation delivering an OQAM type multicarrier signal, when said program is executed by a processor of a modulating device, wherein the instructions configure the modulating device to perform the following acts:

implementing a transformation, from the frequency domain to the time domain, of a set of M real data symbols delivering a set of M transformed symbols, called a complete transformation step, said complete transformation step comprising:

applying a partial Fourier transform to the set of M real data symbols delivering a first subset of C transformed symbols of said set of M transformed symbols with C being strictly smaller than M; and obtaining, from said first subset, a second subset of (M-C) transformed symbols of said set of M transformed symbols, said second subset of (M-C) transformed symbols being the subset complementary to said first subset of C transformed symbols of said set of M transformed symbols, wherein, for a linear phase prototype filter with a length L and a delay parameter D strictly smaller than L−1, such that D=qM/2−1, with q=2q'+1, q' an integer and M is divisible by 2, wherein said obtaining determines said second subset from said first subset, in using the mathematical relationship:

$$u_{M-1-k,n}=(-1)^n u_{k,n}^*,$$

for an integer k such that 0≤k≤M/2−1 with:
  $u_{m,n}$ a transformed symbol associated with the output with index m of the complete transformation step at an instant n;
  * the conjugate operator;

and a polyphase filtering of said M transformed symbols by using said prototype filter implementing polyphase components such that $G_k(z)=z^{-(q-1)}G_{M-1-k}(z^{-1})$ for 0≤k≤M/2−1.

* * * * *